US007508398B1

(12) United States Patent
Montrym et al.

(10) Patent No.: US 7,508,398 B1
(45) Date of Patent: Mar. 24, 2009

(54) TRANSPARENT ANTIALIASED MEMORY ACCESS

(75) Inventors: John S. Montrym, Cupertino, CA (US); Brian D. Hutsell, Milpitas, CA (US); Steven E. Molnar, Chapel Hill, NC (US); Gary M. Tarolli, Concord, MA (US); Christopher T. Cheng, Santa Clara, CA (US); Emmett M. Kilgariff, San Jose, CA (US); Abraham B. de Waal, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 307 days.

(21) Appl. No.: 10/646,076

(22) Filed: Aug. 22, 2003

Related U.S. Application Data

(60) Provisional application No. 60/406,421, filed on Aug. 27, 2002.

(51) Int. Cl.
*G06F 12/10* (2006.01)
*G09G 5/36* (2006.01)
*G09G 5/00* (2006.01)

(52) U.S. Cl. .................. 345/568; 345/545; 345/611
(58) Field of Classification Search .............. 345/568, 345/566, 564, 530, 545, 611, 613, 581, 418; 711/200–206; 382/274, 275
See application file for complete search history.

(56) References Cited

U.S. PATENT DOCUMENTS

| 5,594,854 A * | 1/1997 | Baldwin et al. ............. 345/441 |
| 5,623,692 A * | 4/1997 | Priem et al. ..................... 710/3 |
| 5,664,162 A * | 9/1997 | Dye ............................. 345/532 |
| 5,854,631 A | 12/1998 | Akeley et al. |
| 5,854,637 A * | 12/1998 | Sturges ........................ 345/542 |
| 6,072,500 A | 6/2000 | Foran et al. |
| 6,104,417 A | 8/2000 | Nielsen et al. |
| 6,115,049 A | 9/2000 | Winner et al. |
| 6,128,000 A | 10/2000 | Jouppi et al. |
| 6,137,918 A | 10/2000 | Harrington et al. |
| 6,188,394 B1 * | 2/2001 | Morein et al. ............... 345/555 |
| 6,204,859 B1 | 3/2001 | Jouppi et al. |
| 6,249,853 B1 * | 6/2001 | Porterfield .................. 711/206 |
| 6,362,819 B1 | 3/2002 | Dalal et al. |

(Continued)

OTHER PUBLICATIONS

Fuchs, H., Goldfeather, J., Hultquist, J., Spach, S., Austin, J., Brooks, F., Eyles, J., and Pouton, J. Jul. 1985. "Fast Spheres, Shadows, Textures, Transparencies, and Image Enhancements in Pixel-planes," ACM SIGGRAPH Computer Graphics, Proceedings of the 12th annual conference on Computer graphics, vol. 19 Issue 3, 111-120.*

*Primary Examiner*—Kee M Tung
*Assistant Examiner*—Joni Hsu

(57) ABSTRACT

A system and method for providing antialiased memory access includes receiving a request to access a memory address. The memory address is examined to determine if the memory address is within a virtual frame buffer. If the memory address is within a virtual frame buffer then the memory address is transformed into one or more physical addresses within a frame buffer that is utilized for antialiasing. The frame buffer may be a single memory space containing subpixel information corresponding to pixels of the virtual frame buffer. Subpixels located at the physical addresses within the frame buffer are then accessed. The disclosed invention provides for direct access by a software application.

42 Claims, 11 Drawing Sheets

U.S. PATENT DOCUMENTS

| | | |
|---|---|---|
| 6,366,289 B1 * | 4/2002 | Johns .................. 345/543 |
| 6,429,877 B1 | 8/2002 | Stroyan |
| 6,452,595 B1 | 9/2002 | Montrym et al. |
| 6,469,707 B1 | 10/2002 | Voorhies |
| 6,480,205 B1 | 11/2002 | Greene et al. |
| 6,614,444 B1 | 9/2003 | Duluk, Jr. et al. |
| 6,633,297 B2 | 10/2003 | McCormack et al. |
| 6,717,578 B1 | 4/2004 | Deering |
| 6,833,835 B1 * | 12/2004 | van Vugt .................. 345/566 |
| 7,064,771 B1 | 6/2006 | Jouppi et al. |
| 7,158,148 B2 * | 1/2007 | Toji et al. .................. 345/613 |
| 2002/0140655 A1 * | 10/2002 | Liang et al. .................. 345/89 |

* cited by examiner

606

| A | B | C | D |

| $A_0$ | $A_1$ | $B_0$ | $B_1$ | $C_0$ | $C_1$ | $D_0$ | $D_1$ |
|---|---|---|---|---|---|---|---|
| $A_2$ | $A_3$ | $B_2$ | $B_3$ | $C_2$ | $C_3$ | $D_2$ | $D_3$ |

FIGURE 7B

TRANSPARENT ANTIALIASED MEMORY ACCESS

CROSS REFERENCE TO RELATED APPLICATIONS

This application claims priority from U.S. Provisional Patent Application No. 60/406,421 filed on Aug. 27, 2002 and entitled "Transparent Antialiased Memory Access," which is incorporated herein by reference in its entirety.

BACKGROUND OF THE INVENTION

1. Field of the Invention

This invention relates generally to computer graphics, and more particularly to transparent memory access using a virtual frame buffer to access frame buffer memory, e.g., super frame buffer memory.

2. Description of the Related Art

When rendering an image, polygon edges that are not horizontal or vertical often appear jagged using conventional graphics systems because each pixel has finite physical dimensions. For example, since each pixel is essentially square, a diagonal line or edge rendered using the square pixels appears jagged, similar to a staircase. This effect is known as aliasing. To reduce aliasing, conventional graphics systems perform antialiasing, which helps reduce the effects that the physical dimensions of the pixels have on the appearance of objects being displayed. As a result of antialiasing, diagonal lines and edges appear smoother.

One common antialiasing technique is supersampling, which typically is performed for a portion of the display, called a tile, or the entire display at a time. Broadly speaking, each pixel in the tile or display is considered to be an M×N matrix of subpixels. Data for each polygon in the display is evaluated at each subpixel. Thus, the alpha value, color, and other data for the polygon can differ in, and is evaluated at, each subpixel.

FIG. 1 is a block diagram showing a conventional computer graphics system 100 that uses supersampling to perform antialiasing. As shown in FIG. 1, the computer graphics system 100 shows a superbuffer 102 for storing a multi-sampled display image, a memory frame buffer 104 for storing the actual displayed image, and an application 106 that creates and edits the actual displayed image. As mentioned above, each pixel in the actual displayed image is considered to be an M×N subpixel matrix that is stored in a superbuffer 102.

As is well known to those skilled in the art, current computer graphics standards often require that applications 106 have access to, and the ability to edit, images in the memory frame buffer 104. Hence, the conventional computer graphics system 100 needs to express the superbuffer 102 as a normal frame buffer, which can be accessed by the application 106. To this end, when the application 106 requests to access the memory frame buffer 104, the conventional computer graphics system 100 reduces the superbuffer 102 to the resolution of the normal memory frame buffer 104. Generally, this is done in manner similar to that described above, wherein the subpixels for each displayed pixel are sampled to determine the exact composition of the displayed pixel.

After the application 106 finishes editing the memory frame buffer 104, the conventional computer graphics system 100 recreates the superbuffer by expanding the memory frame buffer 104. In particular, each pixel within the memory frame buffer 104 is copied to all the subpixels comprising the M×N matrix for the pixels. Unfortunately, the process of reducing and expanding the superbuffer 102 to provide frame buffer access to applications 106 causes undesirable effects to occur in the image, as described next with reference to FIG. 2A.

FIG. 2A is a diagram showing a reduction and expanding pixel/subpixel process utilized in a conventional computer graphics system. As mentioned above, when the application requests to edit the memory frame buffer, the conventional computer graphics system reduces the superbuffer to the resolution of a normal frame buffer. For example, FIG. 2A shows a subpixel matrix 200a corresponding to a pixel of the normal frame buffer. In this example, the subpixel matrix 200a is a 2×2 matrix having two black subpixels and two white subpixels.

To reduce the superbuffer to the resolution of the normal frame buffer, the conventional computer graphics system examines the subpixels corresponding to each pixel of the normal frame buffer. The subpixels are then processed to generate the corresponding pixel. For example, in the subpixel matrix 200a, 50% of the subpixels are black and 50% of the subpixels are white. When processed, a pixel having 50% black and 50% white is generated, which results in a gray pixel 202.

More particularly, a filter kernel generally is used to process the subpixels of the superbuffer during reduction. The filter kernel is a function that processes a predefined number of subpixels to produce each pixel of the normal frame buffer. It should be noted that often the filter kernel is configured to process pixels in excess of the number of pixels comprising each subpixel matrix of the superbuffer, which can provide enhanced antialiasing. However, as noted below, a filter kernel thusly configured often also enhances undesirable color "bleeding" effects.

Once each pixel 202 of the normal frame buffer 104 has been created, the application can access and edit the contents of the frame buffer 104. In this manner, the application can edit or replace the displayed image that is stored in the frame buffer. Often, an application will only change the values of particular pixels within the frame buffer, leaving remaining pixels unaltered. For example, when displaying a menu screen an application generally only alters pixels of selected menu elements. As a result, many pixels of the frame buffer 104 can remain unaltered after the application has completed editing. In FIG. 2A, for example, the gray pixel 202 has not been altered by the application, and thus continues to have the same value as it did when first reduced.

When the application has completed accessing the normal frame buffer 104, the superbuffer is reconstructed by replicating the pixels of the normal frame buffer. Specifically, for each pixel of the normal frame buffer, the properties of the pixel are copied to each subpixel of the corresponding subpixel matrix of the super buffer. For example, in FIG. 2A, the gray color value of pixel 202 is copied to each subpixel in the new matrix 200b.

Unfortunately, although the application program did not alter pixel 202, all the subpixels of the corresponding new subpixel matrix 200b have changed to gray. As a result, image color values can change throughout the image although they are not altered by the application program. In graphics systems wherein the filter kernel is configured to process pixels in excess of the number of pixels comprising each subpixel matrix of the superbuffer, this effect is compounded. In particular, color values continue to "bleed" into one another each time the superbuffer is reduced. As a result, in these configurations, the image can appear to continuously blur over time.

FIG. 2B illustrates another prior art system that performs supersampling in which the subpixels are spread out over four separate frame buffer memories. Within this system, two separate graphics chips are used, 210a and 210b, and four separate and separately addressable frame buffer memories are used 230a-230d. Each graphics chip 210a-210b renders into only the two frame buffers that are connected with it, e.g., chip 210a interfaces with and renders into frame buffers 230a and 230b and chip 210b interfaces with and renders into frame buffers 230c and 230c. The four frame buffers 230a-230d make up the superframe buffer 200a of FIG. 2A where there are four subpixels for each pixel of the displayed frame buffer. Each subpixel is stored in a respective frame buffer of buffers 230a-230d. When displaying an image on display 250, a combiner 240 (e.g., in the master device of the graphics chips) performs an aggregation function on the four subpixels from the frame buffers 230a-230d and outputs a single value for the pixel. A processor 220 interfaces with chips 210a and 210b. In systems of FIG. 2B that are supersampled, four Z values and four color values are stored for each pixel; that is each subpixel contributes a respective color and a respective Z value.

In operation, when writing a triangle primitive into the frame buffers, each graphics chip would write into one of its frame buffers, e.g., 230a, and then jitter the primitive and write the jittered version into the second frame buffer, e.g., 230b. On read back, the subpixels from the frame buffers 230a-230d were aggregated as described above.

A problem with the system of FIG. 2B is that it is complicated because it requires four separate frame buffer memories to provide a superbuffer having four subpixels per frame buffer pixel. Each graphics chip can only render into two frame buffer memories. Therefore, if more subpixels are required per pixel, then more graphics chips would be required. Moreover, the aggregation function 240 is computationally expensive and the time required to separately address each of the four frame buffers 230a-230d can reduce graphics performance.

In view of the foregoing, there is a need for systems and methods for antialiasing that provide enhanced antialiasing without undesirable side effects, such as color value changes and blurring. The methods should further allow application programs to access the buffer as required by current industry standards.

SUMMARY OF THE INVENTION

Generally, embodiments of the present invention fill these needs by providing antialiasing using a frame buffer and a virtual frame buffer, which allow applications to access the frame buffer. In one embodiment, antialiased memory access includes receiving a request to access a memory address. The memory address is examined to determine if the memory address is within a virtual frame buffer. If the memory address is within a virtual frame buffer then the memory address is transformed into one or more physical addresses within a frame buffer that is utilized for antialiasing. A subpixel located at each of the one or more physical addresses within the frame buffer is then accessed. In one embodiment, the present invention provides for direct access by a software application. Supersampling or multisampling may be used.

Supersampling is rendering a high resolution image, such that each fragment that is textured and shaded corresponds to a subpixel sample. Multisampling is similar, but each fragment corresponds to a pixel, but contains subpixel coverage. The (single) fragment color is written to all samples that are updated.

Antialiased memory read access is provided in an additional embodiment of the present invention. As above, a request to read a memory address within memory is received. A determination is then made as to whether the memory address is within a predefined memory range. When the memory address is outside the predefined memory range, the data at the memory address is accessed normally. However, when the memory address is within the predefined memory range, the memory address is transformed into at least one physical address within a frame buffer utilized for antialiasing, and a subpixel value at the physical address within the frame buffer is read. Optionally, the processor, e.g., CPU, can be provided with a pitch value of the frame buffer. In this aspect, the CPU can calculate a physical address within the frame buffer using the pitch value of the frame buffer.

Additionally, antialiased memory read access is provided in a further embodiment of the present invention which operates as follows. A request to read a memory address within memory is received. A determination is then made as to whether the memory address is within a predefined memory range. When the memory address is outside the predefined memory range, the data at the memory address is read normally. However, when the memory address is within the predefined memory range, the memory address is transformed into a plurality of physical addresses within a frame buffer utilized for antialiasing. Each physical address stores a subpixel value related to a specific pixel. The plurality of subpixel values at the plurality of physical addresses within the frame buffer is read, and the subpixel values are combined to generate a pixel value for the specific pixel. In one aspect, the subpixel values are combined by blending the subpixel values into a single color value.

Additionally, antialiased memory write access in a further embodiment of the present invention is described as follows. A request to write a data value to a memory address within memory is received, and determination is made as to whether the memory address is within a predefined memory range. When the memory address is within the predefined memory range, the memory address is transformed into a plurality of physical addresses within a frame buffer utilized for antialiasing, and the data value is written to the plurality of physical addresses within the frame buffer. As above, the data value can be written to the memory address normally when the memory address is outside the predefined memory range. Optionally, a base address of the predefined memory address can be the same as a base address of the frame buffer. However, this is not required, and in some embodiments the base address of the predefined memory address can be different from a base address of the frame buffer.

In this manner, the processor, e.g., the central processing unit, can access pixel values generated from values in the frame buffer in a manner similar to accessing a normal frame buffer. Further, the subpixels stored in the frame buffer remain unaltered after read operations. Moreover, using the embodiments of the present invention, software copying from the frame buffer to a normal sized frame buffer is no longer required. As a result, performance is increased because clock cycles are no longer spent on copying, and quality is increased because non-requested subpixel color changes no longer occur.

In another embodiment, a read access to antialiased memory includes receiving a request to read a memory address. In this embodiment, if the memory address is within a virtual frame buffer, then transforming the memory address into at least one physical address within a frame buffer that is utilized for antialiasing. A subpixel value is read from the at least one physical address within the frame buffer.

Another embodiment, antialiased memory read access includes receiving a request to read a memory address and determining whether the memory address is within a virtual frame buffer. In this embodiment, if the memory address is outside the virtual frame buffer the data at the memory address is read. If the memory address is within the virtual frame buffer, the memory address is transformed into multiple physical addresses within a frame buffer that is utilized for antialiasing. Each physical address stores a subpixel value related to a specific pixel. The subpixel value is read from each of the multiple physical addresses within the frame buffer. The subpixel values can then be combined to generate a pixel value for the specific pixel.

Another embodiment is drawn to antialiased memory write access including receiving a request to write a data value to a memory address. The memory address is examined to determine if the memory address is within a virtual memory buffer. When the memory address is within the virtual memory buffer, the memory address is transformed into multiple physical addresses within a frame buffer that utilized for antialiasing. The data value is written to the multiple physical addresses within the frame buffer.

Another embodiment describes reading a frame buffer where the frame buffer includes multiple pixels, each pixel includes multiple subpixels. In this embodiment, an address is received that corresponds to a pixel. The received address is transformed into at least one subpixel address and at least one subpixel is read from the frame buffer using at least one subpixel address. The read subpixel(s) can be blended to create a pixel value.

Another embodiment describes reading a frame buffer where the frame buffer includes multiple pixels, each pixel includes multiple subpixels. An address is received. The received address is transformed into at least one subpixel address and at least one subpixel is read from the frame buffer using at least one subpixel address. The read subpixel(s) can be blended to create a pixel value. The created pixel value is supplied as if it were a pixel value at the received address.

Another embodiment describes writing a frame buffer where the frame buffer includes multiple pixels, each pixel includes multiple subpixels. The embodiment includes receiving an address and a pixel value from a computer program. The computer program supplying the address and pixel value as if accessing a frame buffer that does not include subpixels. The received address is transformed into at least one subpixel address and the pixel value is written as at least two subpixel values using the at least one subpixel address.

Another embodiment includes reading a frame buffer where the frame buffer includes multiple pixels, each pixel includes multiple subpixels. The embodiment includes receiving an address. The received address is transformed into a subpixel address and at least one subpixel value is read from the frame buffer using the subpixel address. The read subpixel value is supplied as if it were a pixel value at the received address.

Another embodiment includes supplying a virtual frame buffer to a computer program including supplying a base address and buffer size information to the computer program where the base address and the buffer size information corresponds to a virtual frame buffer. An address is received in the virtual frame buffer from the computer program. The received address is transformed into at least one subpixel address where the subpixel address being an address in a frame buffer. At least one subpixel is read from the frame buffer using the subpixel address. If more than one subpixel is read, then the subpixels can be blended to create a pixel value. The created pixel value is supplied to the computer program as if it were a pixel value located at the received address in the virtual frame buffer such that the computer program does not directly access the frame buffer.

Another embodiment includes supplying a virtual frame buffer to a computer program including supplying a base address and buffer size information to the computer program. The base address and the buffer size information corresponding to a virtual frame buffer. An address is received in the virtual frame buffer from the computer program. A pixel value is received. The received address is transformed into at least one subpixel address, the subpixel address being an address in a frame buffer. The pixel value is written as at least two subpixels values into the frame buffer using the subpixel address such that the computer program does not directly access the frame buffer.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which:

FIG. 7A illustrates virtual addresses for the pixel group of four horizontally adjacent pixels A, B, C, and D;

FIG. 7B illustrates generated physical addresses for a subpixel group of sixteen subpixels corresponding to the pixels of the pixel group;

DETAILED DESCRIPTION OF THE PREFERRED EMBODIMENTS

A methods are disclosed for antialiasing using a frame buffer and a virtual frame buffer. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
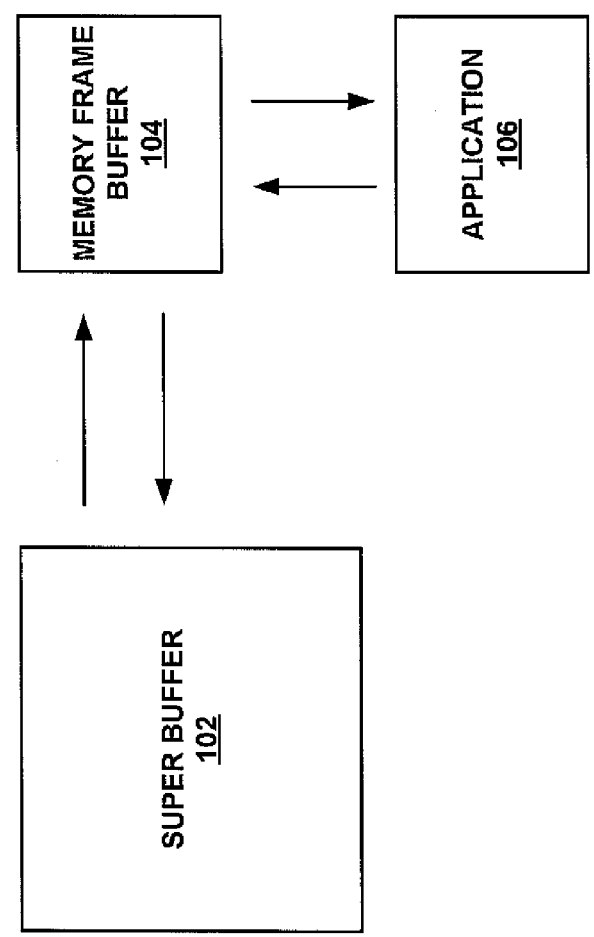
FIG. 1 is a block diagram showing a conventional computer graphics system that uses supersampling to perform antialiasing.
Figure 2A:
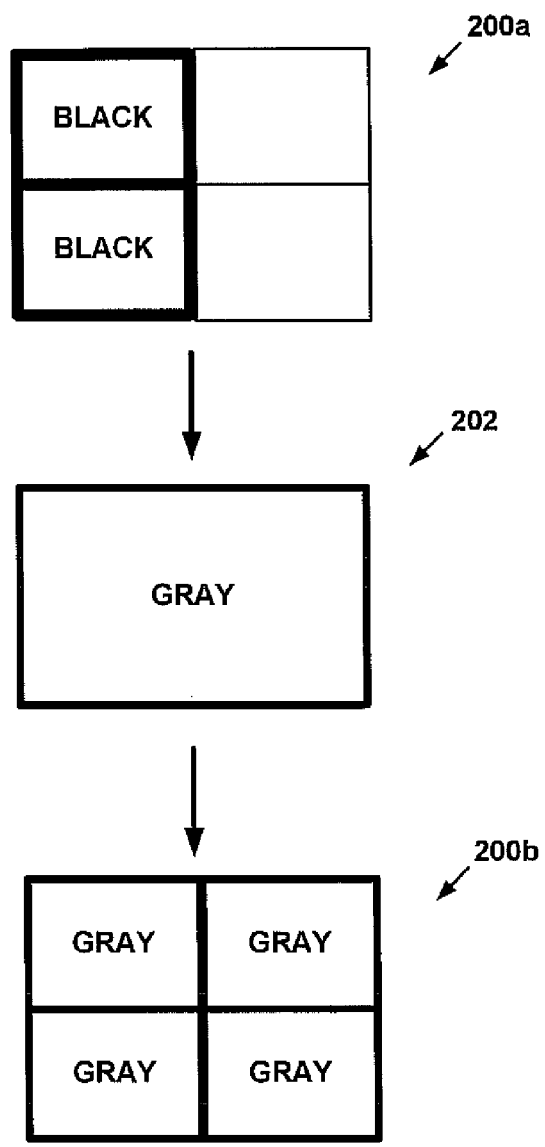
FIG. 2A is a diagram showing a reduction and expanding pixel/subpixel process utilized in a conventional computer graphics system.
Figure 2B:
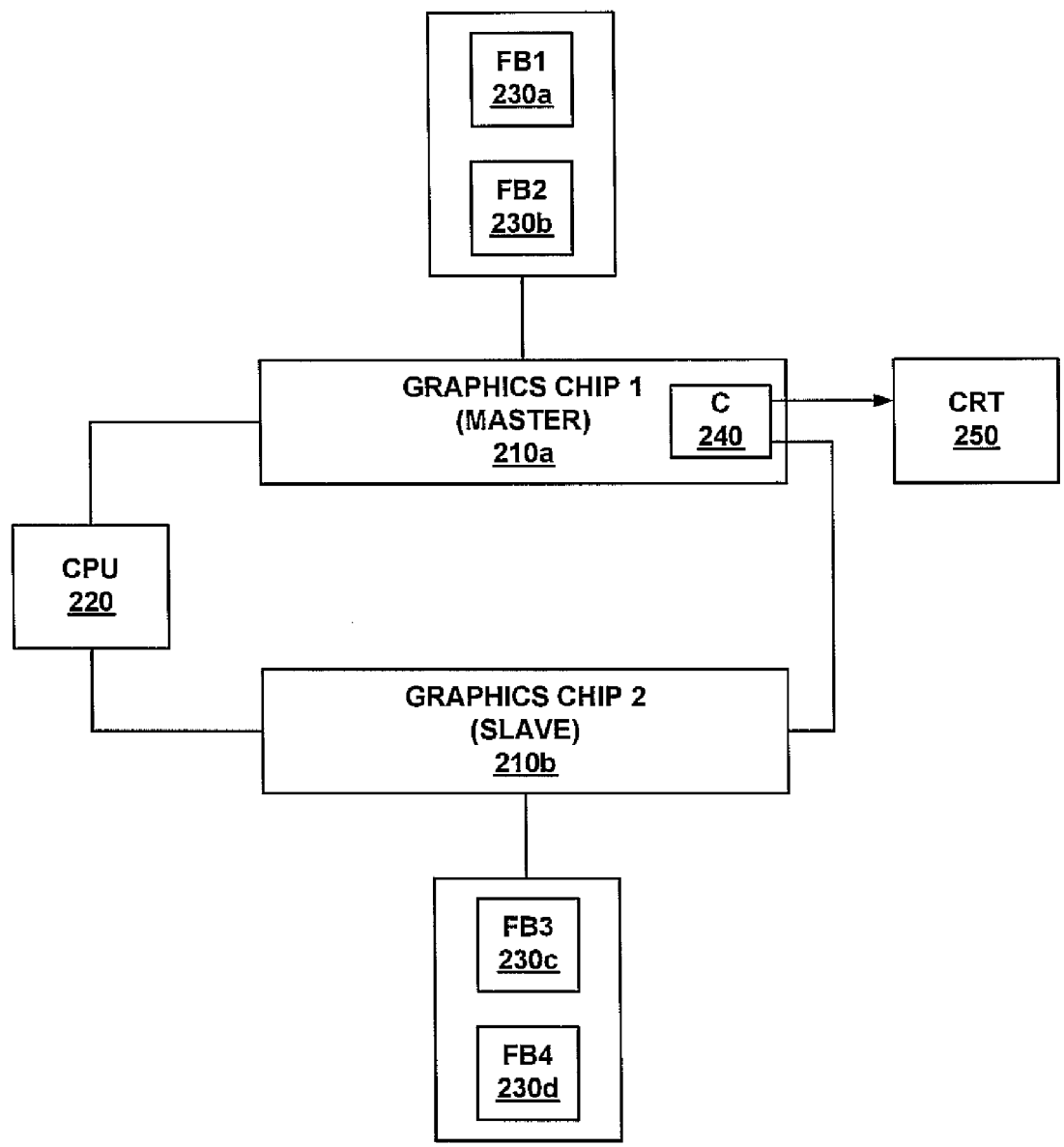
FIG. 2B is a block diagram of a prior art system in which four subpixels comprise a pixel and each subpixel is stored in a separate frame buffer memory.
Figure 3:
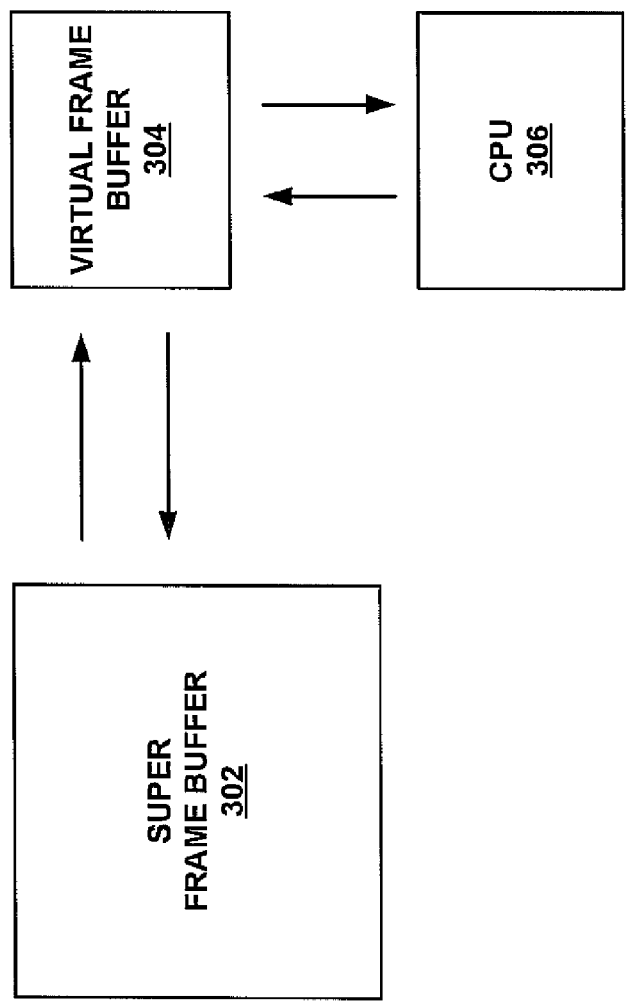
FIG. 3 is a block diagram showing a computer graphics system that uses supersampling and a virtual frame buffer to perform antialiasing, in accordance with an embodiment of the present invention.

FIGS. 1 and 2A, and FIG. 2B were described in terms of the prior art. FIG. 3 is a block diagram showing a computer graphics system 300 that uses supersampling and a virtual frame buffer to perform antialiasing, in accordance with an embodiment of the present invention. Supersampling is used to improve the perceived quality of the display by attenuating aliasing, even though the display resolution is fixed. In supersampling, a number of regularly spaced samples are taken for each pixel. These samples are then re-sampled or averaged out to yield the pixel value on display. This effectively corresponds to creating a virtual image at high resolution and digitally down-filtering the result, to eliminate the high frequencies that are the source of aliasing.

Generally, the virtual frame buffer presents, in one embodiment, the illusion of a conventional frame buffer with regard to access by the application and other frame buffer clients, whereas the underlying implementations contain additional information required for antialiasing and support antialiased rendering and display and optionally could be compressed and not directly readable.

As shown in FIG. 3, the computer graphics system 300 utilizes a frame buffer 302 for storing a multi-sampled display image, a virtual buffer 304 for providing buffer access, and a processor, e.g., a central processing unit (CPU) 306, which executes the application programs that create and edit the displayed image. As above, each pixel in the actual displayed image is stored as a number of subpixels in the frame buffer 302. In one embodiment, the subpixels are stored in an M×N matrix of subpixels in the frame buffer 302. Each subpixel can represent one sample of the pixel in the actual displayed image. The samples of the pixel in the actual displayed image can be from any portion of the pixel according to one or more of the well-known pixel sampling techniques.

Many current computer graphics standards require that the CPU 306 have direct access to a frame buffer in order for application programs to have the ability to edit images in the frame buffer. Embodiments of the present invention provide such access using a virtual frame buffer 304. Broadly speaking, the virtual frame buffer 304 provides address mapping to the frame buffer 302, simulating direct buffer access to the CPU and the application program.

Generally, when an application executing on the CPU 306 requests the ability to access the frame buffer, the hardware is initialized to configure the virtual frame buffer 304, and a pointer to the virtual frame buffer is returned to the application. The hardware intercepts each request within the virtual frame buffer 304, along with the associated frame buffer address. The hardware then maps the frame buffer address to one or more corresponding addresses in a frame buffer 302 that contain the corresponding one or more subpixels. The corresponding addresses may be adjacent in one embodiment. In this manner, the application can access the frame buffer 302 in a manner that simulates direct frame buffer access. However, as will be described subsequently, embodiments of the present invention advantageously avoid non-requested color changes to subpixels when the application program does not alter them. Furthermore, color "bleeding" is avoided using the embodiments of the present invention, as described in greater detail below.

While the memory accesses are described in terms of accessing addresses for pixels and subpixels, one skilled in the art will understand that multiple bytes may be required to define each pixel and subpixel and therefore each address can represent multiple addresses of the multiple bytes. Each memory access can therefore access one or more pixels or subpixels or portions thereof.

In one embodiment, an initialization of the computer graphics system includes defining a base address and a limit address of a virtual frame buffer. As an alternative to a limit address, a virtual frame buffer size can be defined. In addition, the pitch and bit depth of the virtual frame buffer are defined. The bit depth is the number of bits per pixel (e.g., 8-, 16-, 32-bits per pixel and other sizes). The pitch of the virtual frame buffer can be selected to match the pitch of the frame buffer but in alternative embodiments may not match the pitch of the frame buffer. A filter kernel is also defined to provide the down filtering for reading the frame buffer. The down filtering can use any filter scheme desired by the user. A pixel sampling scheme is also defined. The pixel sampling scheme defines the number of samples per pixel and the location and selection of the samples on each pixel that are then stored a subpixel values.

Figure 4:
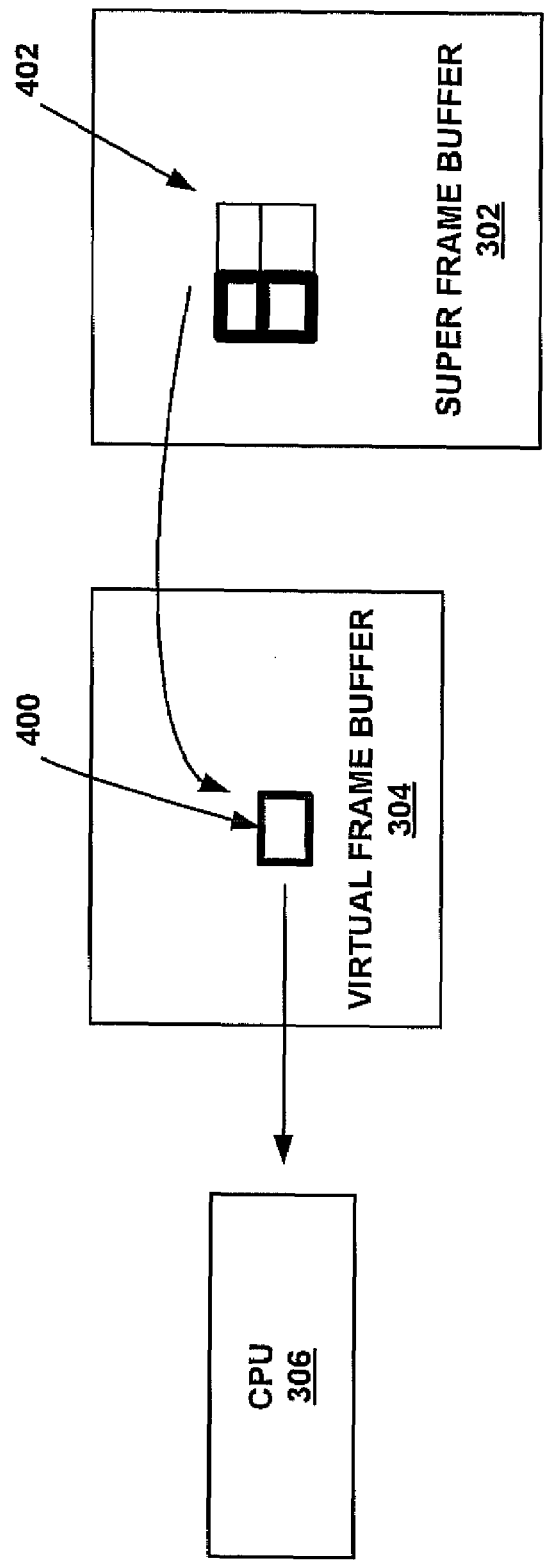
FIG. 4 is a block diagram showing a read access operation using a computer graphics system in accordance with an embodiment of the present invention.

FIG. 4 is a block diagram showing a read access operation using a computer graphics system in accordance with an embodiment of the present invention. Although FIG. 4 illustrates 2×2 sampling in the frame buffer, it should be noted that any size sampling can be utilized with the embodiments of the present invention. Further, it is appreciated that the samples may not be in a regular grid in other embodiments of the present invention and the regular grid shown is merely exemplary. Broadly speaking, embodiments of the present invention identify a region of graphics memory addresses in which requests from the CPU to access graphics memory will undergo a transformation. The transformation allows an application program executing on the CPU to function as though it is accessing a normal frame buffer, when in actuality the application program is accessing the subpixels of the frame buffer.

To read a pixel from the frame buffer, the CPU 306 provides the address of the pixel in graphics memory. Embodiments of the present invention utilize the virtual frame buffer 304 to simulate a normal frame buffer to application programs executing on the CPU 306. Thus, in the example of FIG. 4, the CPU 306 can read a pixel using the virtual frame buffer 304 by supplying the address of the pixel. The memory address supplied by the CPU 306 will be referred to hereinafter as the "virtual address" 400 of the pixel.

Once received, the virtual frame buffer 304 translates the virtual address 400 into one or more physical addresses 402 within the frame buffer 302. The number of physical addresses 402 that map to one virtual address 400 depends on the size of the subpixel matrixes used in the frame buffer 302. In particular, the number of physical addresses 402 that map to one virtual address 400 is equal to the number of subpixels included in each subpixel matrix used in the frame buffer 302. For example, in FIG. 4 the frame buffer 302 uses 2×2 subpixel matrixes for antialiasing, each having a total four subpixels. Thus, four physical addresses 402 will be mapped to each virtual address 400 in the example of FIG. 4.

The virtual frame buffer 304 then performs a read of one or more of the subpixels at the physical addresses within the frame buffer 302. In one embodiment, the virtual frame buffer 304 performs the read by returning one of the subpixels at the physical address. In a further embodiment, the virtual frame buffer 304 performs the read by blending the subpixels at the physical addresses to generate the pixel value returned to the CPU 306. For example, in the subpixel matrix 402 of FIG. 4, 50% of the subpixels are black and 50% of the subpixels are white. When blended, a pixel having 50% black and 50% white is generated, which results in a gray pixel 400. In this manner, the CPU 306 receives a pixel value for the pixel virtual address 400 supplied to the virtual frame buffer 304 in a manner similar to accessing a normal frame buffer. Further, the subpixels 402 stored in the frame buffer remain unaltered after the read operation. Similar operations are performed during a write operation, as described next with reference to FIG. 5.

Figure 5:
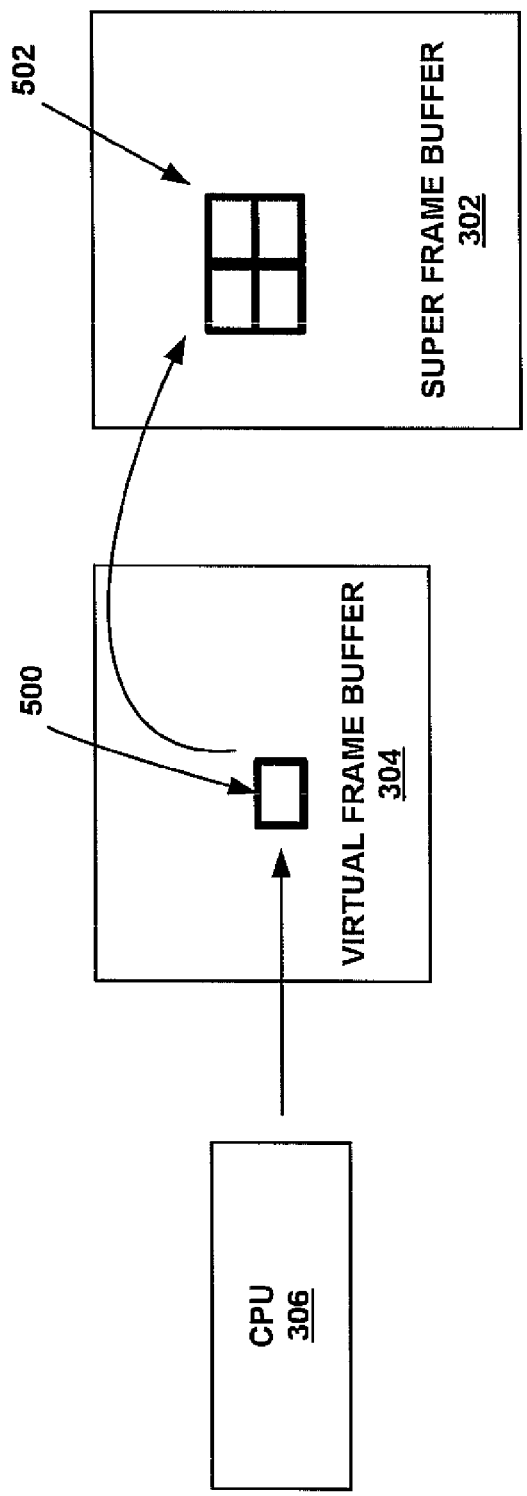
FIG. 5 is a block diagram showing a write access operation using a computer graphics system in accordance with an embodiment of the present invention.

FIG. 5 is a block diagram showing a write access operation using a computer graphics system in accordance with an embodiment of the present invention. As above, although FIG. 5 illustrates 2×2 sampling in the frame buffer, it should be noted that any size sampling could be utilized with the embodiments of the present invention.

To write a pixel to the frame buffer, the CPU 306 provides the address of the pixel in the computer memory (e.g. the graphics memory or other portions of the computer memory) and the pixel value. As above, embodiments of the present invention utilize the virtual frame buffer 304 to simulate a normal frame buffer to application programs executing on the CPU 306. Thus, in the example of FIG. 5, the CPU 306 can write a pixel using the virtual frame buffer 304 by supplying the address of the pixel, that is, the virtual address 500, and the pixel value.

Once received, the virtual frame buffer 304 translates the virtual address 500 into one or more physical addresses 502 within the frame buffer 302. As during a read operation, the number of physical addresses 502 that map to one virtual address 500 depends on the size of the subpixel matrixes used in the frame buffer 302. In particular, the number of physical addresses 502 that map to one virtual address 500 is equal to the number of subpixels included in each subpixel matrix used in the frame buffer 302. For example, in FIG. 5 the frame buffer 302 uses 2×2 subpixel matrixes for antialiasing, each having a total four subpixels. Thus, four physical addresses 502 will be mapped to each virtual address 500 in the example of FIG. 5.

The virtual frame buffer 304 then writes the provided pixel value to one or more of the subpixels at the physical addresses 502 within the frame buffer 302. In one embodiment, during a write operation, the pixel values provided to the virtual frame buffer 304 are replicated to all the subpixels of the corresponding subpixel matrix 502 in the frame buffer 302. However, it should be noted that embodiments of the present invention can further process the subpixels of the corresponding subpixel matrix 502 in the frame buffer 302 when additional image information is known. In such cases, varying subpixel values can be selected for the subpixels of the corresponding subpixel matrix 502 based on the provided pixel values and surrounding pixel values. In this manner, the CPU 306 can write pixel values for the pixel to the virtual address 500 supplied to the virtual frame buffer 304 in a manner similar to accessing a normal frame buffer.

Figure 6:
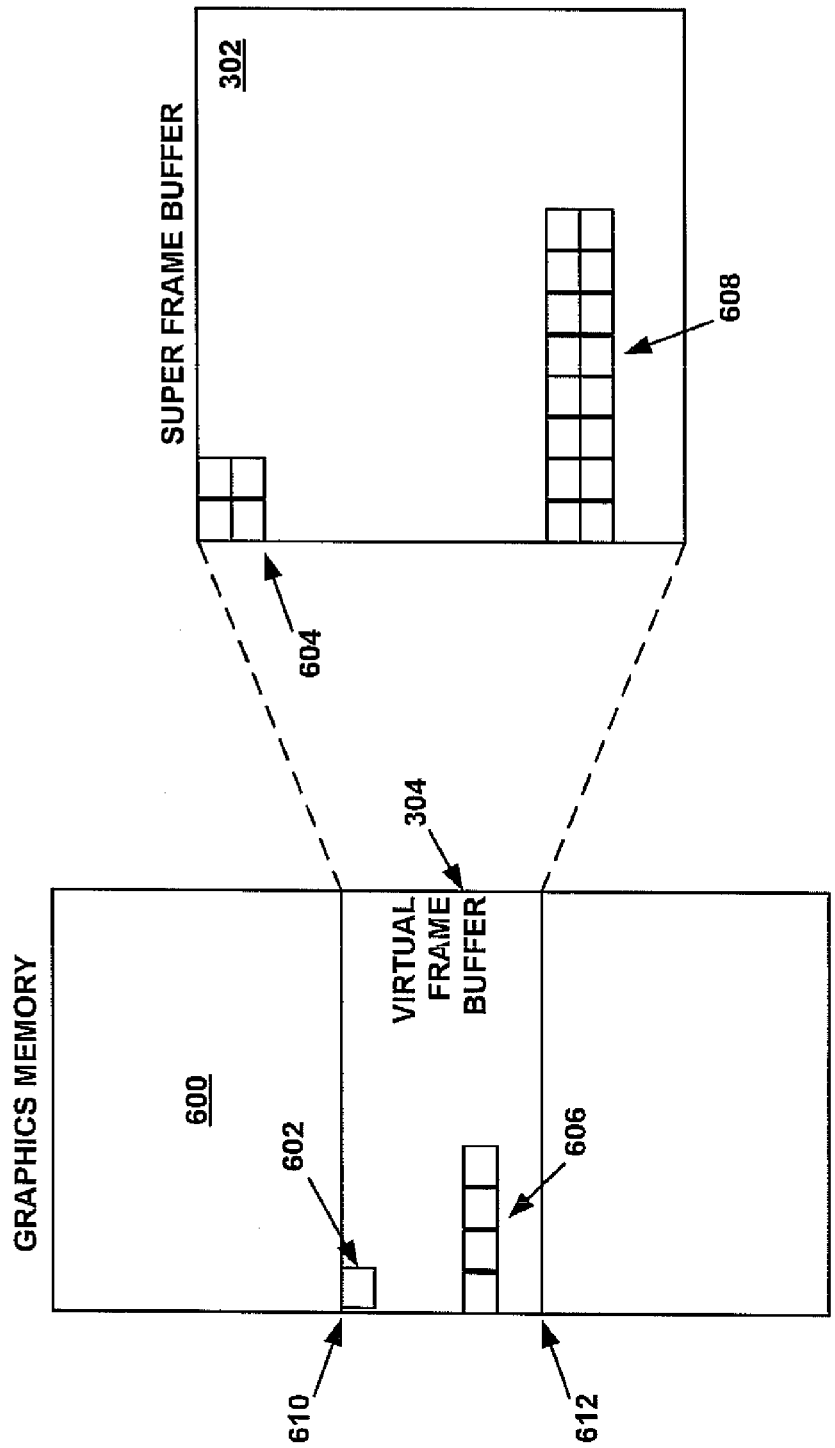
FIG. 6 is a diagram illustrating a graphics memory configuration using a virtual frame buffer, in accordance with an embodiment of the present invention.

FIG. 6 is a diagram illustrating a graphics memory configuration using a virtual frame buffer 304, in accordance with an embodiment of the present invention. As shown in FIG. 6, an embodiment of the present invention defines a region of graphics memory 600 as a virtual frame buffer 304. Once defined, requests to access the graphics memory 600 are examined to determine the memory address of the request. Graphics memory requests to access memory addresses before the beginning address 610 of the virtual frame buffer 304, or after the ending address 612 of the virtual frame buffer 304, are allowed to occur as normal. That is, the memory access request is allowed to occur without transformation.

However, when an incoming address falls within the address range that defines the extent of the virtual frame buffer 304, the incoming address 602 is transformed into physical addresses 604 within the frame buffer 302. For example, when the incoming address is for a pixel 602 in the virtual frame buffer 304, the incoming address is transformed into four physical addresses 604 within the frame buffer 302, in the example of FIG. 6.

In one embodiment, a pitch for the frame buffer 302 is stored in a register, which is provided to the CPU when calculating memory addresses within the virtual frame buffer 304. The pitch is the distance, in address units, between two vertically adjacent pixels. When using the frame buffer 302, the pitch is the distance, in address units, between two vertically adjacent subpixels. As is well known in the art, when given an X-Y frame buffer, where X defines the width and Y defines the height, an address of a pixel can be defined as:

$$(y*pitch)+(x*bytes\ per\ pixel)+base\ address\ of\ frame\ buffer, \quad (1)$$

where x is the x-coordinate of the pixel, y is the y-coordinate of the pixel, and pitch is the pitch of the frame buffer. This calculation is generally performed using the CPU prior to a memory access request. Embodiments of the present invention allow the CPU to use the same equation when using the virtual frame buffer, however, an embodiment of the present invention can provide the CPU with the pitch of the frame buffer 302 as the pitch of the virtual frame buffer instead of providing the pitch of a normal frame buffer. In this manner, the CPU can assist the GPU in computing addresses within the frame buffer transparently as if it is calculating an address for a normal frame buffer.

The base address used for the virtual frame buffer 304 and the frame buffer 302 can be configured to reduce area and cost. Specifically, the base address for the virtual frame buffer 304 and the frame buffer 302 can be the same to simplify the physical address computations. However, it should be noted that embodiments of the present invention are not limited to identical base addresses, and thus, the virtual frame buffer 304 and the frame buffer 302 can have different base addresses. Moreover, in some embodiments, the base address for the frame buffer 302 can be outside available memory space. For example, this virtual frame buffer may live in its own dedicated address space without underlying physical memory.

For example, in one embodiment, when performing a write operation to a pixel 602 having a memory address within the virtual frame buffer 304, the pixel values are copied to all the corresponding subpixels 604 in the frame buffer 302. In particular, physical addresses are generated for each subpixel 604 of the subpixel matrix corresponding to the pixel 602. Then, the properties of the pixel 602 are written to each subpixel 604 of the subpixel matrix corresponding to the pixel 602.

When performing a read operation, as above, physical addresses are generated for each subpixel 604 of the subpixel matrix corresponding to the pixel 602. The subpixels 604 are then read. In one embodiment, a filter that blends the subpixels 604 is applied and a resulting pixel value is returned to the CPU as the value for pixel 602. In a further embodiment, one subpixel 604 is selected from the subpixels corresponding to the pixel 602, and the value of the selected subpixel is returned to the CPU as the value for pixel 602. In one embodiment, only the subpixels contributing to the value of the pixel must be read.

In addition, embodiments of the present invention allow any granularity access that the CPU can accomplish using a normal frame buffer, to map correctly to the super buffer 302. Thus, if the CPU can access multiple pixels at once, the virtual frame buffer 304 can transform the addresses of the pixels into physical addresses within the frame buffer 302. For example, when the CPU is capable of performing thirty-two bit memory accesses and there are eight bits per pixel, four pixels can be accessed simultaneously by the CPU. When the CPU accesses a pixel group 606 of four pixels in one memory access, the addresses of the pixel group 606 are transformed into sixteen physical addresses 608 within the frame buffer 302, in the example of FIG. 6. As previously mentioned, although the examples discussed thus far have been described in terms of 4× data sampling for antialiasing, it should be noted that any size data sampling can be used with the embodiments of the present invention.

FIGS. 7A and 7B illustrate a example of a thirty-two bit CPU access using a virtual frame buffer where each pixel is eight bits, in accordance with an embodiment of the present invention. Specifically, FIG. 7A illustrates virtual addresses for the pixel group 606 of four horizontally adjacent pixels A, B, C, and D. When the virtual frame buffer receives pixel group 606, the virtual frame buffer transforms these virtual addresses into a plurality of physical addresses within the frame buffer, as shown in FIG. 7B.

FIG. 7B illustrates generated physical addresses for a subpixel group 608 of sixteen subpixels corresponding to the pixels of the pixel group 606. In the example of FIG. 7B, the frame buffer uses 2×2 subpixel matrixes to represent each pixel. Hence each virtual address of the pixel group 606 is transformed into four physical addresses within the frame buffer. For example, virtual address A is transformed into four physical addresses $A_0$, $A_1$, $A_2$, and $A_3$ in the frame buffer. Similarly, virtual address B is transformed into four physical addresses $B_0$, $B_1$, $B_2$, and $B_3$ in the frame buffer. A similar transformation occurs for virtual address C and virtual address D. In each group of physical addresses $A_0$-$A_3$, $B_0$-$B_3$, $C_0$-$C_3$, and $D_0$-$D_3$, the pitch used is the stored pitch of the frame buffer, as described previously.

Figure 8:
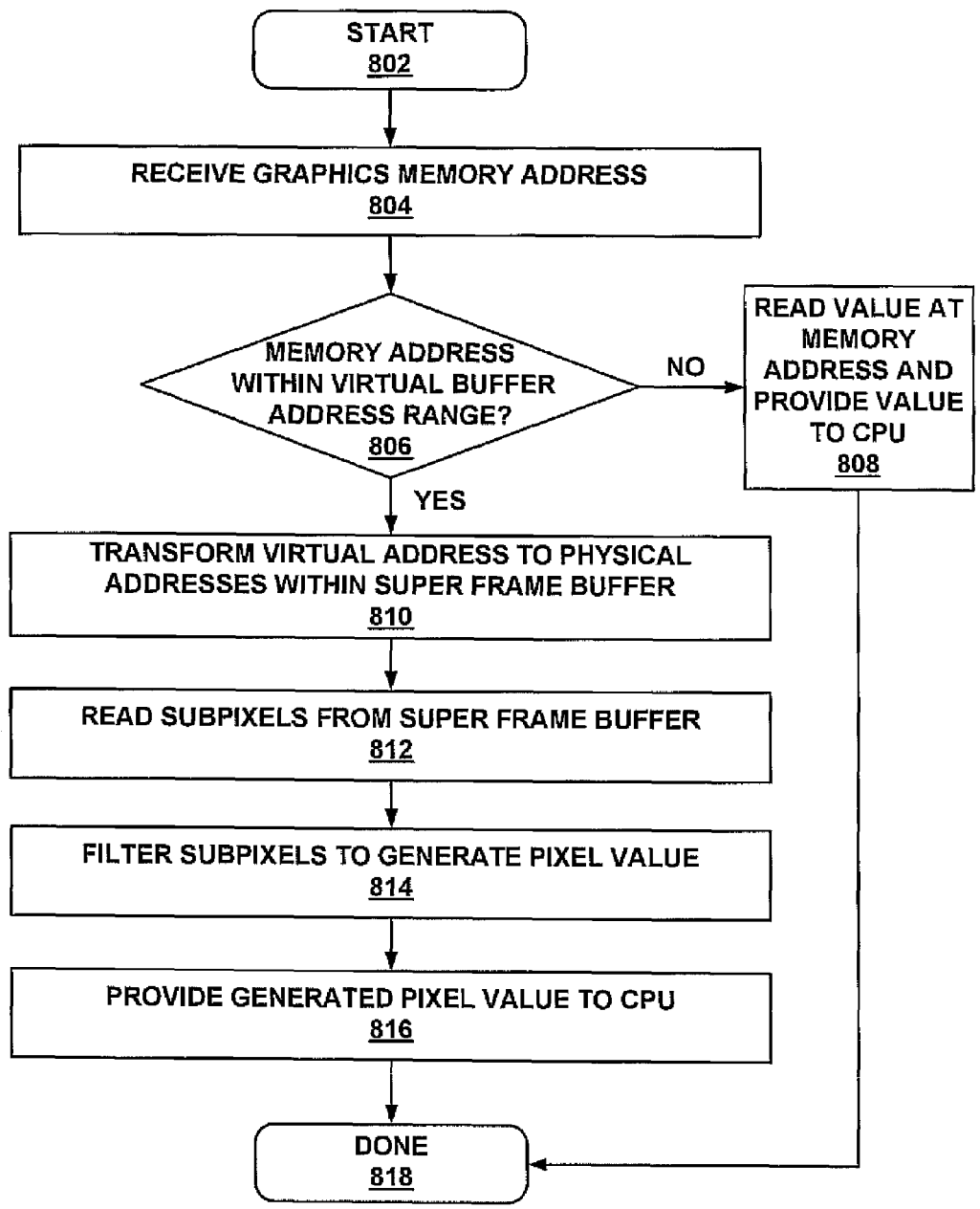
FIG. 8 is a flowchart showing a method for performing a read operation using a virtual frame buffer and blending, in accordance with an embodiment of the present invention.

FIG. 8 is a flowchart showing a method 800 for performing a read operation using a virtual frame buffer and blending, in accordance with an embodiment of the present invention. Process 800 may be implemented as instructions stored in a memory of a computer system and executed on one or more processors thereof. As mentioned above, the virtual frame buffer can perform read operations by returning one of the subpixels at the physical address, or by blending the subpixels at the physical addresses to generate the pixel value returned to the CPU. Method 800 illustrates a read operation wherein the subpixels are blended to generate the pixel value returned to the CPU.

In operation 804, a graphics memory address is received from the CPU. In one embodiment, a graphics processing unit (GPU) is utilized to facilitate access to graphics memory. Generally, the GPU is assigned its own graphics memory, which can include the virtual frame buffer, frame buffer, and other memory, such as command buffers. To access the graphics memory, the CPU sends a request to the GPU to access memory at a particular address, or range of addresses. In alternative embodiments, the CPU can also directly access the graphics memory and in particular the frame buffer.

A decision is then made as to whether the memory address is within the defined address range of the virtual frame buffer, in operation 806. As mentioned above, embodiments of the present invention define a region of graphics memory as a virtual frame buffer, however the virtual frame buffer can also be in other portions of the memory other than the graphics memory. Once defined, requests to access the graphics memory are examined to determine the memory address of the request. If the memory address is outside the defined address range of the virtual frame buffer, the method 800 branches to operation 808. Otherwise, the method 800 continues with operation 810.

In operation 808, the value at the received memory address is read and provided to the CPU. Hence, CPU requests to access memory addresses before the beginning address of the virtual frame buffer, or after the ending address of the virtual frame buffer, are allowed to occur as normal. That is, the memory access request is allowed to occur without transformation.

However, if the memory address is within the defined address range of the virtual frame buffer, the virtual address is transformed into physical addresses within the frame buffer, in operation 810. Specifically, when performing a read operation, physical addresses are generated for each subpixel of the subpixel matrix corresponding to the pixel. In one embodiment, the CPU can assist in calculating the physical addresses within the frame buffer. In this embodiment, the pitch of the frame buffer is stored in a register. This pitch value is then provided to the application when access is requested to the frame buffer.

The subpixels are read from the frame buffer, in operation 812. During operation 812, the values stored at the physical addresses generated in operation 810 are read from the frame buffer. As mentioned above, the frame buffer can store data for each pixel in the actual displayed image as an M×N subpixel matrix. In this manner, the color values for the subpixels of the subpixel matrix can be varied to provide antialiasing.

In operation 814, the subpixel values are filtered to generate a pixel value. As mentioned above, each pixel is stored as an M×N subpixel matrix in the frame buffer. In operation 814, these subpixels are filtered, or "blended," to provide a color value for a pixel. For example, if 50% of the subpixels are black and 50% of the subpixels are white, when blended, a pixel having 50% black and 50% white is generated, which results in a gray pixel. However, it should be understood that this filter is not limited to an unweighted average in alternative embodiments the filter could use a weighted average or any other suitable filtering functions that are well known in the by those skilled in the art. The generated pixel value is then provided to the CPU, in operation 816 and the method operations end in operation 818.

In this manner, the CPU receives a pixel value for the pixel virtual address supplied to the virtual frame buffer in a manner similar to accessing a normal frame buffer. Further, the subpixels stored in the frame buffer remain unaltered after the read operation. Moreover, using the embodiments of the present invention, software copying from the frame buffer to a normal sized frame buffer advantageously is no longer required. As a result, performance is increased because clock cycles are no longer spent on copying, and quality is increased because non-requested subpixel color changes no longer occur.

Figure 9:
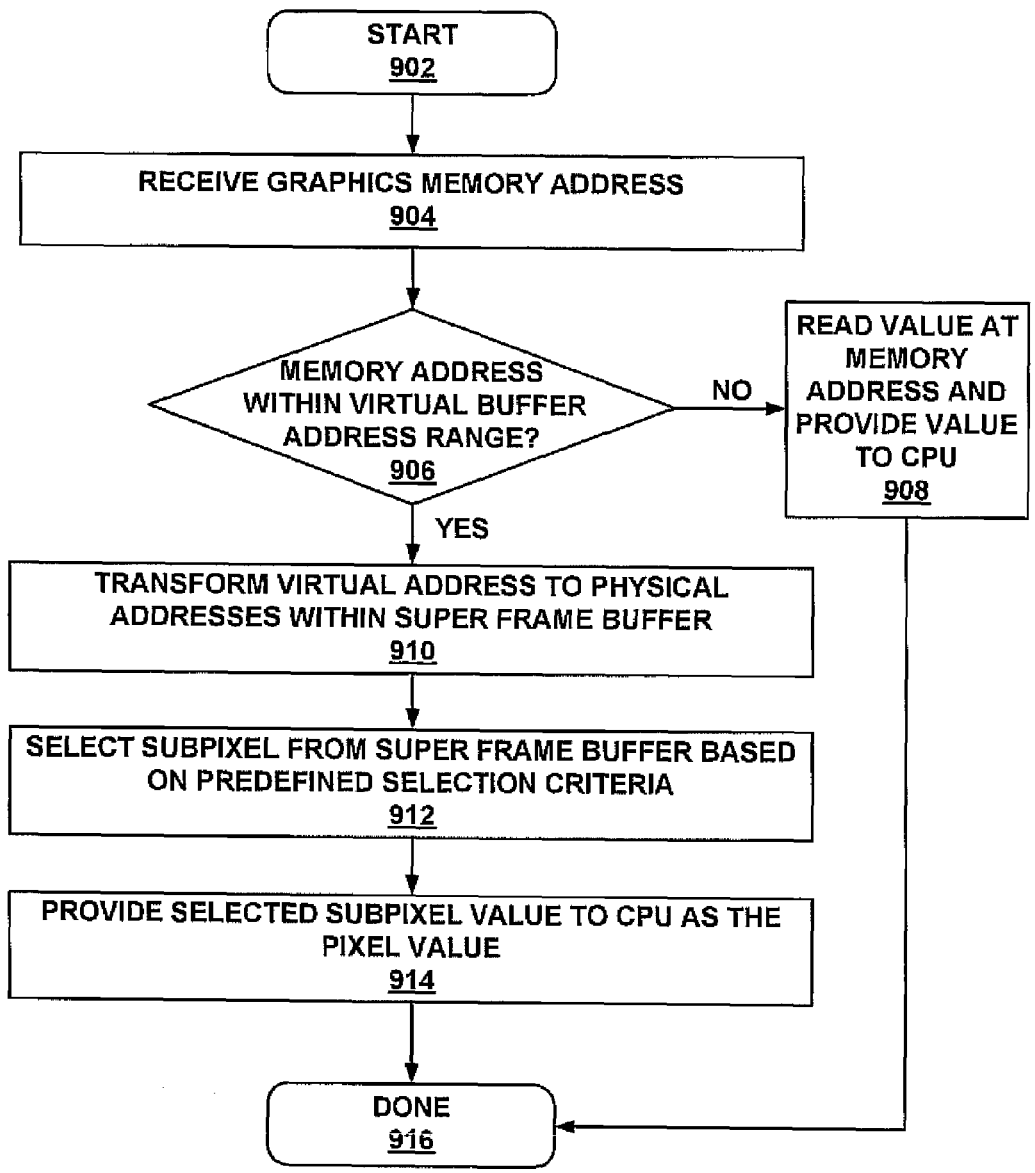
FIG. 9 is a flowchart showing a method for performing a read operation using a virtual frame buffer and subpixel selection, in accordance with an embodiment of the present invention.

FIG. 9 is a flowchart showing a method 900 for performing a read operation using a virtual frame buffer and subpixel selection, in accordance with an embodiment of the present invention. Process 900 may be implemented as instructions stored in a memory of a computer system and executed on one or more processors thereof. As mentioned above, the virtual frame buffer can perform read operations by returning one of the subpixels at the physical address, or by blending the subpixels (e.g., through a filter) at the physical addresses to generate the pixel value returned to the CPU. Method 900 illustrates a read operation wherein one subpixel value is selected to generate the pixel value returned to the CPU.

In operation 904, a graphics memory address is received from the CPU. In one embodiment, GPU is utilized to facilitate access to graphics memory. As mentioned previously, the GPU is assigned its own graphics memory, which can include the virtual frame buffer, frame buffer, and other memory, such as command buffers. To access the graphics memory, the CPU sends a request to the GPU to access memory at a particular address, or range of addresses.

A decision is then made as to whether the memory address is within the defined address range of the virtual frame buffer, in operation 906. If the memory address is outside the defined address range of the virtual frame buffer, the method 900 branches to operation 908. Otherwise, the method 900 continues with operation 910.

In operation 908, the value at the received memory address is read and provided to the CPU. Hence, CPU requests to access memory addresses before the beginning address of the virtual frame buffer, or after the ending address of the virtual frame buffer, are allowed to occur as normal. That is, the memory access request is allowed to occur without transformation.

However, if the memory address is within the defined address range of the virtual frame buffer, the virtual address is transformed to a physical address within the frame buffer, in operation 910. Specifically, when performing a read operation, a physical address is generated for a subpixel of the subpixels corresponding to the pixel. In one embodiment, the CPU can assist in calculating the physical addresses within the frame buffer. In this embodiment, the pitch of the frame buffer is stored in a register. This pitch value is then provided to the application when access is requested to the frame buffer.

A subpixel is selected from the frame buffer based on predefined selection criteria, in operation 912. As mentioned above, the frame buffer stores data for each pixel in the actual displayed image as an M×N subpixel matrix. In this manner, the color values for the subpixels of the subpixel matrix can be varied to provide antialiasing. In operation 912, a subpixel from the M×N subpixel matrix corresponding to the pixel is selected. For example, the subpixel sample nearest the center of the pixel in the subpixel matrix can be selected. The selected subpixel value is then read from frame buffer and provided to the CPU, in operation 914 and the method operations end in operation 916.

In this manner, the CPU receives a pixel value for the pixel virtual address supplied to the virtual frame buffer in a manner similar to accessing a normal frame buffer. In addition, the embodiment of method 900 can increase performance because clock cycles and bandwidth needed to read unused subpixel values are saved.

Figure 10:
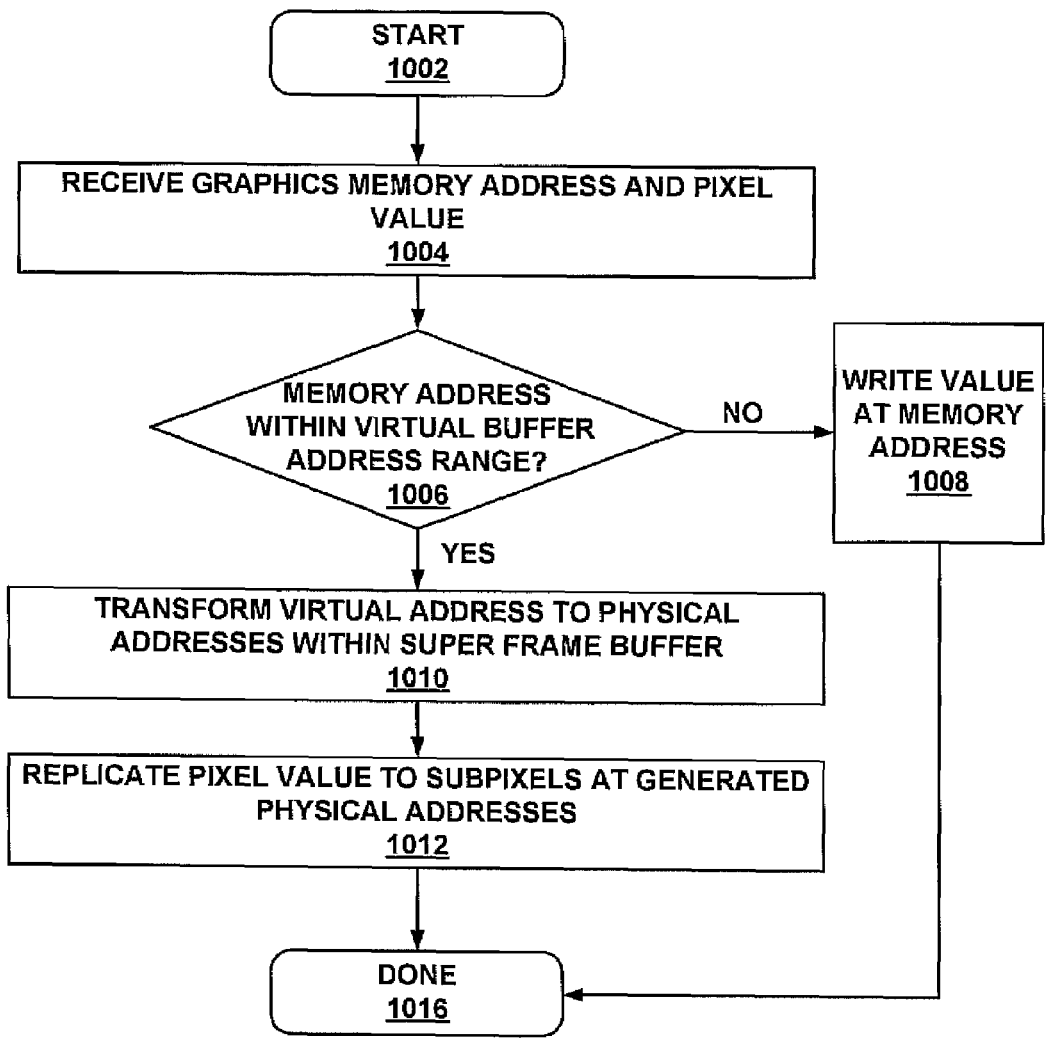
FIG. 10 is a flowchart showing a method for performing a write operation using a virtual frame buffer and subpixel selection, in accordance with an embodiment of the present invention.

FIG. 10 is a flowchart showing a method 1000 for performing a write operation using a virtual frame buffer, in accordance with an embodiment of the present invention. In operation 1004, a graphics memory address is received from the CPU. As mentioned previously, a GPU can be utilized to facilitate access to graphics memory. In this aspect, the GPU is assigned its own graphics memory, which can include the virtual frame buffer, frame buffer, and other memory, such as command buffers. To access the graphics memory, the CPU sends a request to the GPU to access memory at a particular address, or range of addresses.

A decision is then made as to whether the memory address is within the defined address range of the virtual frame buffer, in operation 1006. If the memory address is outside the defined address range of the virtual frame buffer, the method 1000 branches to operation 1008. Otherwise, the method 1000 continues with operation 1010.

In operation 1008, the value at the received memory address is written to the memory address provided by the CPU. Hence, CPU requests to access memory addresses before the beginning address of the virtual frame buffer, or after the ending address of the virtual frame buffer, are allowed to occur as normal. That is, the memory access request is allowed to occur without transformation.

However, if the memory address is within the defined address range of the virtual frame buffer, the virtual address is transformed to physical addresses within the frame buffer, in operation 1010. Specifically, when performing a write operation, physical addresses are generated for each subpixel of the subpixel matrix corresponding to the pixel. In one embodiment, the CPU can assist in calculating the physical addresses within the frame buffer. In this embodiment, the pitch of the frame buffer is stored in a register. This pitch value is then provided to the application when it requests access to the frame buffer.

The received pixel value is replicated to the subpixels at the generated physical addresses, in operation 1012. As mentioned above, the frame buffer stores data for each pixel in the actual displayed image as an M×N subpixel matrix. In this manner, the color values for the subpixels of the subpixel matrix can be varied to provide antialiasing. Thus, in operation 1012, the received pixel value is replicated to the subpixels of the subpixel matrix corresponding to the received virtual memory address. However, it should be noted that embodiments of the present invention can further process the subpixels of the corresponding subpixel matrix in the frame buffer when additional image information is known. In such embodiments, varying subpixel values can be selected for the subpixels of the corresponding subpixel matrix based on the provided pixel value and surrounding pixel values. The method operations end in operation 1016. In this manner, the CPU can write a pixel value for the pixel to the virtual address supplied to the virtual frame buffer in a manner similar to accessing a normal frame buffer.

Although an M×N subpixel matrix is described above, it is appreciated that embodiments of the present invention apply to samples on an irregular grid. In these embodiments, there are N samples at locations in the neighborhood of the pixel center. Other representations are possible, aside from a regular pixel matrix, such as a set of fragments with subpixel coverage, hierarchies of samples, etc.

It should be appreciated that the instructions represented by the operations in FIGS. 8-10 above are not required to be performed in the order illustrated, and that all the processing represented by the operations may not be necessary to practice the invention. Further, additional processing may precede or follow the operations described in FIGS. 8-10 above.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for providing antialiased memory access, said method comprising:
receiving a request to access a memory address; and
determining if the memory address is within a virtual frame buffer and, if so, performing the following:

transforming the memory address into at least one physical address within a frame buffer utilized for antialiasing, wherein said memory address is associated with a pixel, wherein said at least one physical address is associated with a plurality of subpixels, wherein said frame buffer is a single memory comprising data associated with said plurality of subpixels, wherein said plurality of subpixels correspond to at least one pixel of said virtual frame buffer, and wherein a base address of said frame buffer is the same as a base address of said virtual frame buffer; and accessing data associated with a subpixel at the at least one physical address within the frame buffer.

2. A method as recited in claim 1 further comprising accessing data at the memory address provided the memory address is not within said virtual frame buffer.

3. A method as recited in claim 1, wherein the virtual frame buffer comprises a predefined memory range of a graphics memory.

4. A method as recited in claim 1, wherein the memory address is received from a central processing unit (CPU).

5. A method as recited in claim 4, further comprising providing the CPU with a pitch value of the frame buffer, wherein said pitch value comprises a distance in address units between two of said plurality of subpixels.

6. A method as recited in claim 5, further comprising the CPU calculating a physical address within the frame buffer using the pitch value of the frame buffer as the pitch of the virtual frame buffer.

7. A method as recited in claim 1, wherein said plurality of subpixels corresponding to said pixel of said virtual frame buffer have physical addresses that are nearby each other.

8. A method as recited in claim 7, wherein said physical addresses are also based on a base physical address which corresponds to said memory address.

9. A method for providing antialiased memory read access, said method comprising:

receiving a request to read a memory address;
determining whether the memory address is within a virtual frame buffer;
reading data at the memory address when the memory address is outside the virtual frame buffer;
transforming the memory address into at least one physical address within a frame buffer utilized for antialiasing, wherein the memory address is within the virtual frame buffer and is associated with a pixel, wherein said at least one physical address is associated with a plurality of subpixels, wherein said frame buffer is a single memory comprising data associated with said plurality of subpixels, wherein said plurality of subpixels correspond to at least one pixel stored in said virtual frame buffer, and wherein a base address of said frame buffer is the same as a base address of said virtual frame buffer; and
reading a subpixel value at the at least one physical address within the frame buffer.

10. A method as recited in claim 9, further comprising providing the subpixel value to a central processing unit (CPU).

11. A method as recited in claim 10, further comprising providing the CPU with a pitch value of the frame buffer, wherein said pitch value comprises a distance between two of said plurality of subpixels.

12. A method as recited in claim 11, further comprising the CPU calculating a physical address within the frame buffer using the pitch value of the frame buffer as the pitch of the virtual frame buffer.

13. A method as recited in claim 9, wherein the virtual frame buffer includes a predefined memory range of a graphics memory.

14. A method as recited in claim 9, wherein said plurality of subpixels corresponding to said pixel of said virtual frame buffer have physical addresses that are nearby each other and are also based on a base physical address which corresponds to said memory address.

15. A computer system comprising a processor coupled to a memory, said computer system further comprising at least one peripheral device coupled to said processor, wherein said memory comprises instructions for implementing a method of providing antialiased memory access, said method comprising:

receiving a request to read a memory address;
determining whether the memory address is within a virtual frame buffer;
reading data at the memory address when the memory address is outside the virtual frame buffer;
transforming the memory address into at least one physical address within a frame buffer utilized for antialiasing, wherein the memory address is within the virtual frame buffer and is associated with a pixel, wherein said at least one physical address is associated with a plurality of subpixels, wherein said frame buffer is a single memory comprising data associated with said plurality of subpixels, wherein said data associated with said plurality of subpixels comprises respective subpixel values for each of said plurality of subpixels, wherein said plurality of subpixels correspond to at least one pixel stored in said virtual frame buffer, and wherein a base address of said frame buffer is the same as a base address of said virtual frame buffer;
reading the plurality of subpixel values at the at least one physical address within the frame buffer; and
combining the subpixel values to generate a pixel value for the specific pixel.

16. A system as recited in claim 15 wherein said method further comprises providing the pixel value to a central processing unit (CPU).

17. A system as recited in claim 16, wherein said method further comprises:

providing the CPU with a pitch value of the frame buffer, wherein said pitch value comprises a distance between two of said plurality of subpixels; and
the CPU calculating a physical address within the frame buffer using the pitch value of the frame buffer as the virtual frame buffer pitch.

18. A system as recited in claim 15, wherein said combining comprises blending the subpixel values into a single color value.

19. A system as recited in claim 15, wherein the virtual frame buffer includes a predefined memory range of a graphics memory.

20. A system as recited in claim 15, wherein said plurality of subpixels corresponding to each pixel of said virtual frame buffer have physical addresses that are nearby each other and are also based on a base physical address which corresponds to a memory address of said pixel of said virtual frame buffer.

21. A method for providing antialiased memory write access comprising:

receiving a request to write a data value to a memory address;
determining whether the memory address is within a virtual frame buffer;
transforming the memory address into at least one physical address within a frame buffer utilized for antialiasing, wherein the memory address is within the virtual frame buffer and is associated with a pixel, wherein said at least one physical address is associated with a plurality of subpixels, wherein said frame buffer is a single memory comprising data associated with said plurality of subpixels for each pixel of said virtual frame buffer, wherein said at least one physical address relates to a plurality of subpixels corresponding to a pixel of said virtual frame buffer that is located at said memory address, and wherein a base address of said frame buffer is the same as a base address of said virtual frame buffer; and writing the data value to the at least one physical address within the frame buffer.

22. A method as recited in claim 21, further comprising writing the data value to the memory address when the memory address is outside the virtual memory buffer.

23. A method as recited in claim 21, wherein the virtual frame buffer comprises a predefined memory range of a graphics memory.

24. A method as recited in claim 21, further comprising:
providing a CPU with a pitch value of the frame buffer, wherein said pitch value comprises a distance between two of said plurality of subpixels; and
the CPU calculating a physical address within the frame buffer using the pitch value of the frame buffer as the pitch of the virtual memory buffer.

25. A method as recited in claim 21, wherein said plurality of subpixels corresponding to each pixel of said virtual frame buffer have physical addresses that are nearby each other and are also based on a base physical address which corresponds to a memory address of said pixel of said virtual frame buffer.

26. A method for reading a frame buffer comprising:
receiving an address corresponding to a pixel, said address associated with a virtual frame buffer for mapping a pixel address into a plurality of subpixel addresses;
transforming the received address into multiple subpixel addresses, wherein each of said multiple subpixel addresses comprises a mapped subpixel address;
reading at least two subpixels from the frame buffer using at least two of the multiple subpixel addresses, wherein the frame buffer comprises a plurality of pixels, wherein each pixel comprises a plurality of subpixels, and wherein a base address of said frame buffer is the same as a base address of said virtual frame buffer; and
blending the at least two subpixels to create a pixel value for said pixel.

27. A method as recited in claim 26 further comprising:
supplying the pixel value as if it were a pixel value at the received address.

28. A method for writing a frame buffer comprising:
receiving an address and a pixel value corresponding to a pixel, said address associated with a virtual frame buffer for mapping a pixel address into a plurality of subpixel addresses;
transforming the received address into multiple subpixel addresses, wherein each of said multiple subpixel addresses comprises a mapped subpixel address; and
writing the pixel value to a frame buffer as multiple subpixel values using the multiple subpixel addresses, wherein said frame buffer comprises a plurality of pixels wherein each pixel comprises a plurality of subpixels, and wherein a base address of said frame buffer is the same as a base address of said virtual frame buffer.

29. A method as recited in claim 28 further comprising:
modifying at least one of said multiple subpixel values in said frame buffer based upon a pixel value of a surrounding pixel.

30. A method for supplying a virtual frame buffer to a computer program, said method comprising:
supplying a base address and buffer size information to the computer program, the base address and the buffer size information corresponding to a virtual frame buffer;
receiving an address in the virtual frame buffer from the computer program;
transforming the received address into at least one subpixel address, the subpixel address being an address into a frame buffer which is a single memory storing data of a plurality of subpixels corresponding to each pixel of said virtual frame buffer, and wherein a base address of said frame buffer is the same as a base address of said virtual frame buffer;
reading at least two subpixels from the frame buffer using the subpixel address;
blending the at least two subpixels to create a pixel value;
supplying the created pixel value to the computer program as if it were a pixel value located at the received address in the virtual frame buffer; and
wherein the computer program does not directly access the frame buffer.

31. A method as recited in claim 30, wherein the computer program is an operating system.

32. A method as recited in claim 30, wherein the computer program is a software driver.

33. A method as recited in claim 30, wherein the computer program is an application program.

34. A method as recited in claim 30, wherein the virtual frame buffer comprises a predefined memory range of a graphics memory.

35. The method as recited in claim 34, further comprising supplying a pitch to the computer program, the pitch corresponding to the virtual frame buffer and being equal to a pitch of the frame buffer, wherein the base address of the virtual frame buffer is the same as a base address of the frame buffer.

36. The method as recited in claim 30 wherein said plurality of subpixels corresponding to each pixel of said virtual frame buffer comprise nearby physical memory addresses within said frame buffer.

37. A computer system comprising a processor coupled to a memory, wherein said memory comprises instructions for implementing a method of supplying a virtual frame buffer to a computer program, comprising:
supplying a base address and buffer size information to the computer program, the base address and the buffer size information corresponding to a virtual frame buffer;
receiving an address in the virtual frame buffer from the computer program;
receiving a pixel value;
transforming the received address into at least one subpixel address, the at least one subpixel address being an address in a frame buffer, wherein said at least one subpixel address is associated with a plurality of subpixels, wherein said frame buffer is a single memory comprising said plurality of subpixels corresponding to each pixel of said virtual frame buffer and wherein said plurality of subpixels comprise nearby physical addresses, and wherein a base address of said frame buffer is the same as a base address of said virtual frame buffer;
writing the pixel value as at least two subpixels values into the frame buffer using the subpixel address; and
wherein the computer program does not directly access the frame buffer.

38. A system as recited in claim 37, wherein the computer program is an operating system.

39. A system as recited in claim 37, wherein the computer program is a software driver.

40. A system as recited in claim 37, wherein the computer program is an application program.

41. A system as recited in claim 37, wherein the virtual frame buffer comprises a predefined memory range of a graphics memory.

42. A system as recited in claim 37, wherein said method further comprises supplying a pitch to the computer program, the pitch corresponding to the virtual frame buffer and being equal to a pitch of the frame buffer, wherein the base address of the virtual frame buffer is the same as a base address of the frame buffer.

* * * * *